United States Patent

[11] 3,609,748

[72] Inventors Walter Parfomak
Wallington, N.J.;
Robert J. Molnar, New York, N.Y.
[21] Appl. No. 760,303
[22] Filed Sept. 17, 1968
[45] Patented Sept. 28, 1971
[73] Assignee The Bendix Corporation

[54] CONTROL NETWORK FOR A SOLID STATE DISPLAY SYSTEM
8 Claims, 6 Drawing Figs.

[52] U.S. Cl. 340/324, 340/325
[51] Int. Cl. G01d 7/00
[50] Field of Search 340/324, 166 EL, 334, 335, 339; 313/108, 109.5

[56] References Cited
UNITED STATES PATENTS

| | | | |
|---|---|---|---|
| 3,328,790 | 6/1967 | Rhodes | 340/166 |
| 3,460,127 | 8/1969 | Pahlavan | 340/324 |

OTHER REFERENCES

Electroluminescence: An Appraisal For Avionic Display Applications Information Display March/April 1966 Donald J. Pizzicara pp. 26– 36 (copy in 340– 324)

*Primary Examiner*—John W. Caldwell
*Assistant Examiner*—Marshall M. Curtis
*Attorneys*—Herbert L. Davis and Plante, Hartz, Smith and Thompson

ABSTRACT: A control network for a solid-state display system which indicates the value of an input control signal on a segmented electroluminescent indicator in which unique circuitry is employed to control and drive the display through a provision of a plurality of fine control switches, coarse control switches and associated diode switching logic means.

INVENTORS
WALTER PARFOMAK
ROBERT J. MOLNAR
BY Herbert L. Davis
ATTORNEY

INVENTORS
WALTER PARFOMAK
ROBERT J. MOLNAR
BY Herbert L. Davis
ATTORNEY

COARSE SWITCH HOLDS FIRST 10 FINE EL SEGMENTS

COARSE SWITCH CONTROLS SEGMENT 11

COARSE SWITCH PREPARES SEGMENTS 12 TO 22 FOR FINE SWITCHING FUNCTION

INVENTORS
WALTER PARFOMAK
ROBERT J. MOLNAR
BY Herbert L. Davis
ATTORNEY

CONTROL NETWORK FOR A SOLID STATE DISPLAY SYSTEM

CROSS-REFERENCE TO RELATED APPLICATIONS

The present invention relates to improvements in a solid state display system of a type disclosed and claimed in a copending U.S. application Ser. No. 535,745, filed Mar. 21, 1966, and now U.S. Pat. No. 3,440,637, granted Apr. 22, 1969, while the driven step integrator network for operating the control network of the present invention may be of a type disclosed and claimed in a copending U.S. application Ser. No. 411,803, filed Nov. 17, 1964; and now U.S. Pat. No. 3,427,609, granted Feb. 11, 1969; both of which patents have been granted jointly to Robert J. Molnar and Walter Parfomak, the joint inventors of the present invention and all of which patents have been assigned to The Bendix Corporation, the assignee of the present invention.

The display system to which the present invention is applicable may include a condition sensor, comparator, drive circuitry, driven step integrator network and feedback summation network which may be generally of a type such as disclosed and claimed in the aforenoted U.S. Pat. No. 3,440,637.

However, the optoelectronic matrix and photoconductor switching arrangement heretofore provided in the aforenoted U.S. Pat. No. 3,440,637 for controlling the electroluminescent display segments has been replaced in the present invention by the provision of an improved control network for the electroluminescent display segments, including a plurality of fine control transistors switches, coarse control transistor switches and associated diode switching logic means forming the subject matter of the present invention.

The improved control network of the present invention increases the speed of operation of the display system, eliminates crosstalk and blinking problems, simplifies fabrication problems, and improves reliability of operation of the solid-state display system of the present invention over that of the optoelectronic matrix and photoconductor switching arrangement operated by the driven network of the aforenoted U.S. Pat. No. 3,440,637.

BACKGROUND OF THE INVENTION

1. Field of the Invention

The invention is in the field of solid-state display with electronic drive circuitry, and, more particularly, to an improved control network for an electroluminescent type of display.

2. Description of the Prior Art

Heretofore solid-state display systems have been provided including means for controlling the illumination of a stack of electroluminescent segments which may be of a type similar to that of the electroluminescent segments disclosed in a U.S. Pat. No. Re. 26,207, granted May 23, 1967 to Frederick Blancke Sylvander and assigned to The Bendix Corporation.

In the present invention, the specific control circuitry for this stack of electroluminescent segments is quite different from that disclosed in the U.S. Pat. No. Re. 26,207 in the provision of a control network in which the electroluminescent segments are grouped in sections with each section being separately controlled by a coarse control switching transistor associated with each section. A single set of fine control switching transistors of a number one less than the number of electroluminescent segments in each section, serves to sequentially control the illumination of the individual electroluminescent segments of each section up to the last segment of each section, while the illumination of this last segment is dependent upon the controlling action of an associated coarse control switching transistor.

Thus, such coarse control switching transistor upon actuation acts as an extra fine control switch for effecting illumination of the highest valued segment in the section associated therewith, while simultaneously upon the actuation of such coarse control switching transistor there is provided a holding action with respect the the preceding segments of such section. Moreover, the actuated coarse control switching transistor further serves to condition the segments of a next succeeding section for sequential illumination thereafter by the same single set of fine control switching transistors and a next succeeding coarse control switching transistor.

A U.S. Pat. No. 1,780,711, granted Nov. 4, 1930, to Ira Jean Lichter has been noted as of general interest in regard to the multiple functions of the coarse control switches while a U.S. Pat. No. 2,404,074, granted July 16, 1946, to Thomas A. Keen is of general interest in regard to the coarse and fine control switches.

Such prior art, however, fails to suggest the three simultaneous functions of the coarse control transistor switches of the present invention in providing (1) a holding operation for the illuminated electroluminescent segments of each section while (2) simultaneously effecting illumination of the terminal electroluminescent segment of each section and furthermore (3) conditioning each of the electroluminescent segments of the next succeeding section for selective illumination by the fine control transistor switches and the next succeeding coarse control transistor switch.

Furthermore, the prior art fails to suggest the arrangement of the present invention of fine control transistor switches, coarse control transistor switches and associated diode switching logic means to provide high speed operation of the electroluminescent display while eliminating crosstalk and blinking problems in the controlled electroluminescent display.

Moreover, the prior art fails to suggest the simplified control network for effecting the multiple function switching actions of the present invention whereby there is effectively increased the reliability of operation of the electroluminescent display system through the simplified switching means in an arrangement in which good performance of the electroluminescent display system may be maintained under extreme variations in the prevailing temperature conditions.

SUMMARY OF THE INVENTION

The invention contemplates an improved network for controlling illumination of a stack of electroluminescent segments so that the activated lighted electroluminescent segments correspond to a decimal representation of the value of an analog input, while there are also activated those electroluminescent segments indicative of analog values below that of the uppermost value indicated by any activated segment. This is effected through a switching arrangement in which all of the electroluminescent segments are divided into sections with the same number of segments in each section, each section being controlled by an associated coarse control switch and each segment in a section being individually controlled by separately operable fine control switches.

An object of the present invention is to provide in such an electroluminescent control network a plurality of coarse control transistors in which one coarse control transistor is associated with each of the sections of electroluminescent segments, while a single set of fine control transistors serve to sequentially control the illumination of individual electroluminescent segments in all sections dependent upon a cross controlling action of the coarse control transistors and in which the coarse control transistor associated with each section serves upon actuation to (1) effect individual illumination of the highest value segment of the associated section, (2) effect a group holding action with respect to the other illuminated segments of the associated section and (3) condition the group of segments of the next succeeding section for sequential control of the illumination of the individual segments of such group by the same set of fine control transistors and a next succeeding coarse control transistor.

Another object of the invention is to provide a control network for electroluminescent display segments in which the type of optoelectronic matrix including photoconductor switches driven by the network and step integrator disclosed and claimed in the aforenoted U.S. Pat. No. 3,440,637 is avoided by the provision of a network of fine control transistor switches, coarse control transistor switches and associated diode switching logic means of the present invention so as to increase the speed of operation of the electroluminescent display system while eliminating crosstalk and blinking problems inherent in the prior device and simplify the fabrication problems of the prior control so that the reliability of operation of the solid state display system is effectively improved.

Another object of the invention is to provide in the aforenoted arrangement a coarse control transistor switching means having the multiple functions of (1) holding a first series of fine illuminated segments of a first group while (2) effecting illumination of the last segment of the first series of segments of the first group, and (3) conditioning a next succeeding group of the electroluminescent segments for a fine switching function.

Another object of the invention is to provide means for effecting (1) high speed operation of an electroluminescent display system, (2) eliminate blinking and crosstalk associated with prior optoelectronic matrix operator drive circuits, and (3) provide a simplified drive network by the multiple function switching techniques of fine and coarse control transistor switches in association with a diode switching logic means, (4) increase reliability of operation of the electroluminescent display system by a simplified control network, and (5) maintain good performance and operation of the electroluminescent display system under extreme changes in prevailing ambient temperature conditions.

These and other objects and advantages of the invention are pointed out in the following description in terms of the embodiment thereof which is shown in the accompanying drawings.

DESCRIPTION OF THE DRAWINGS

Referring to the drawings in which corresponding numerals indicate corresponding parts in the several views.

DESCRIPTION OF THE INVENTION

Figure 2:
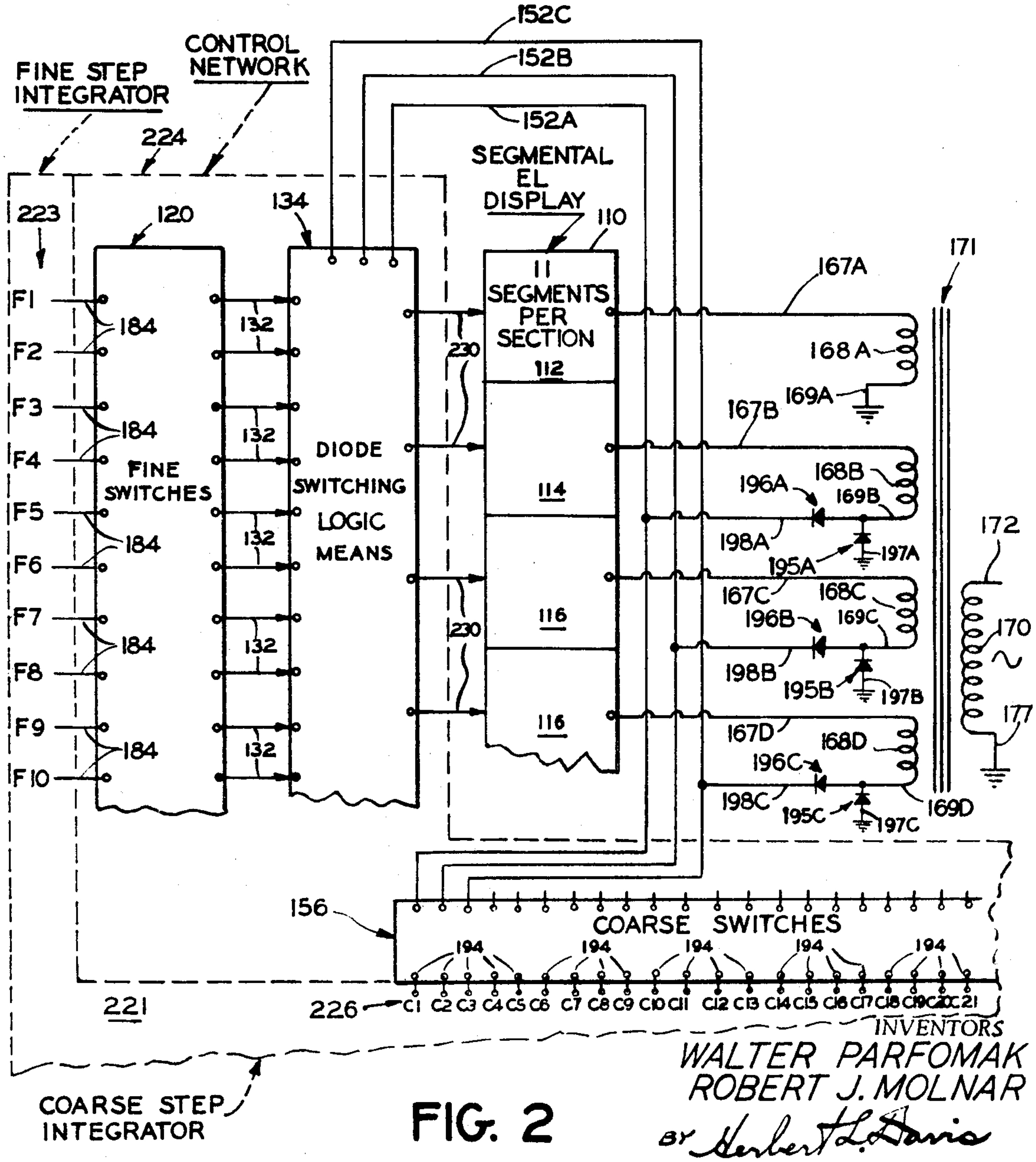
FIG. 2 is a block diagram of a control network for electroluminescent display segments in which the control network is shown operatively connected to fine and coarse control switching networks driven by fine and coarse step integrator networks which may include electronic step integrators of the type described and claimed in the U.S. Pat. No. 3,427,609 applied in fine and coarse memory sections as taught in the aforenoted U.S. Pat. No. 3,440,637.
Figure 3:
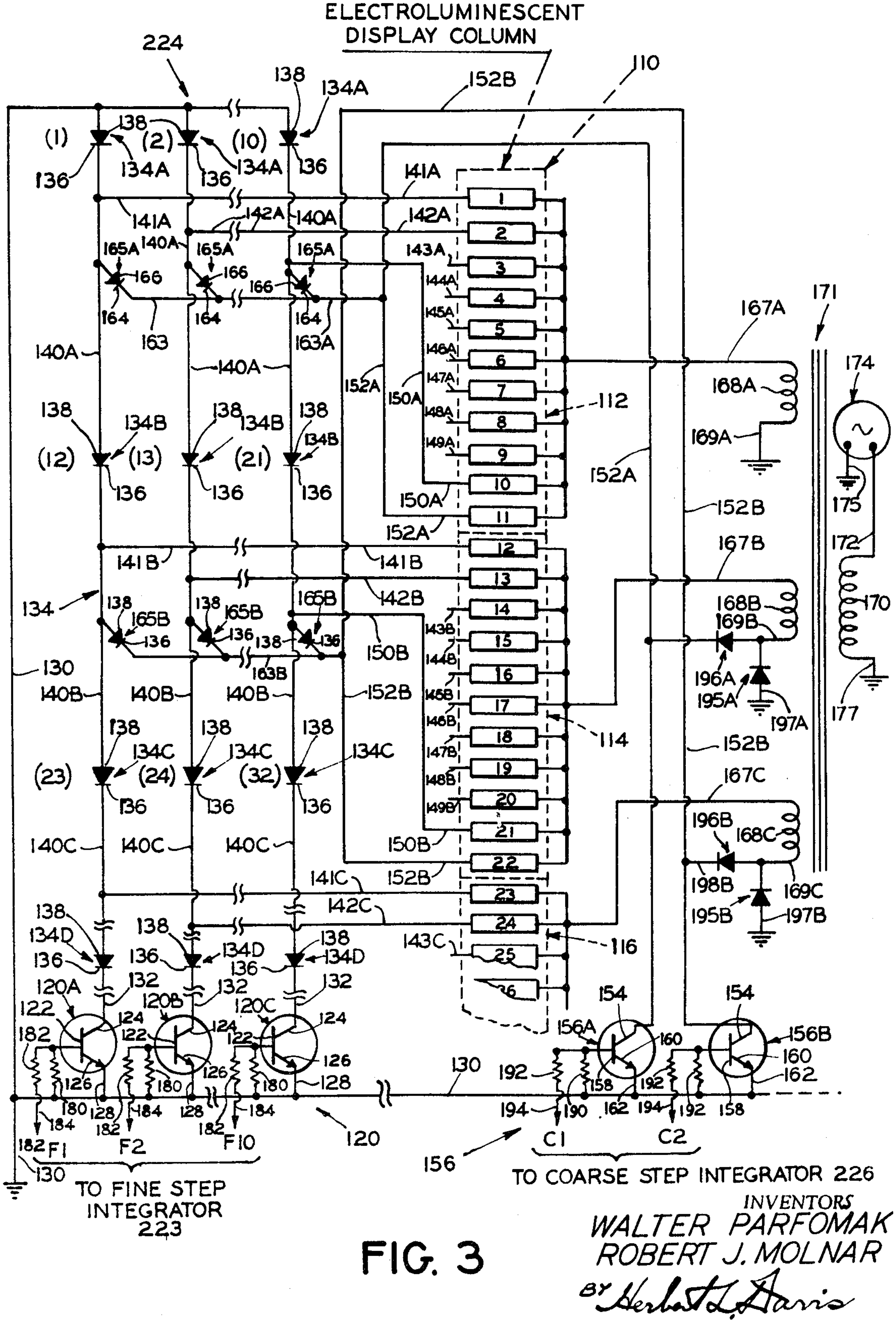
FIG. 3 is a wiring diagram showing a partial network of fine and coarse control transistor switches and associated diode switching logic means for selectively operating the electroluminescent segments.

Referring to the drawings of FIGS. 2 and 3, there is indicated by the numeral 110 a variably lighted segmental electroluminescent indicator display column 110 which may be viewed by the operator and so arranged in cooperative relation with suitable indicia as to provide a desired indicator function.

The display column 110, as shown schematically in FIG. 3, includes a series of electroluminescent segments of a conventional type having thin films of a phosphor material sandwiched or positioned immediately between two electrical conductive layers, one or both of which may be transparent.

Each electroluminescent segment is essentially a capacitor which is so arranged that upon the application of an alternating current voltage across the outer conductive layers thereof, the phosphor material sandwiched between the outer conductive layers will emit light, as heretofore explained in the aforenoted U.S. Pat. No. Re. 26,207, while upon a direct current voltage being applied thereto, the capacitor effect of the electroluminescent segment serves to block the passage of the direct current therethrough so that no light is emitted from such electroluminescent segment. In order then to effect illumination of any of the electroluminescent segments there must be completed a circuit for connecting both polarities of the alternating current source across the opposite conductive layers of a selected electroluminescent segment so as to effect the illumination thereof.

Figure 1:
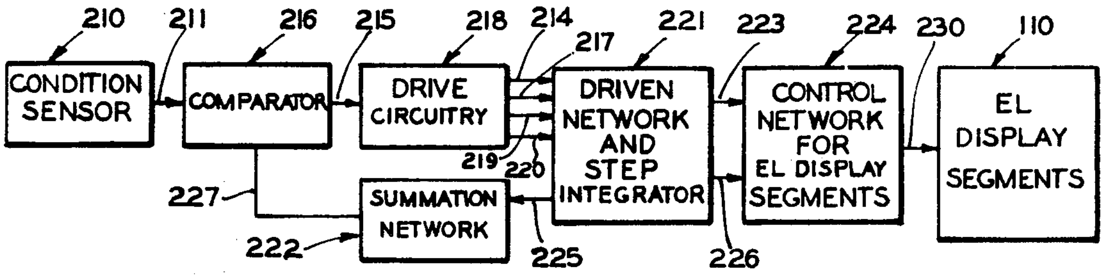
FIG. 1 is a block diagram of an electroluminescent solid state display system embodying the present invention.

In the solid-state display system to which the control network of the present invention may be applied, there is provided, as shown by the block diagram of FIG. 1, a condition sensor 210, comparator 216, drive circuitry 218, driven network and step integrator 221, and summation network 22, all of which may be of a type described in U.S. Pat. No. 3,440,637. Thus the condition sensor 210 may, for example, be (1) a thermocouple of a type arranged to provide an analog direct current signal corresponding to the sensed temperature conditions; or (2) the condition sensor 210 may be of a fuel flow synchro signal sensor of a type which may necessitate the use of a converter such as described and claimed in a U.S. Pat. No. 3,375,508 granted Mar. 26, 1968 to Robert J. Molnar and Walter Parfomak, the joint inventors of the present invention, and assigned to The Bendix Corporation, the assignee of the present invention; or (3) the condition sensor 210 may be a tachometer signal sensing means of a type in which tachometer signals are converted to produce 1 pulse per cycle of rotation of a tachometer generator and in which the amplitude and width of the pulses are controlled so that a filter output produced a direct current analog signal which is an accurate function of the sensed condition or speed of rotation of the tachometer generator.

As indicated by the block diagram of the system of FIG. 1 and explained in the U.S. Pat. No. 3,440,637 the condition sensor 210 provides a direct current analog signal corresponding to the sensed condition which is directed, as shown by the arrow 211, to an electronic error detector such as the comparator 216 which may be analogous to a differential electromechanical system. The comparator 216 may be of a type described and claimed in U.S. Pat. No. 3,363,11, granted Jan. 9, 1968 to Robert J. Molnar and Walter Parfomak, the joint inventors of the present invention, and assigned to The Bendix Corporation, the assignee of the present invention.

In the present invention, however, instead of controlling the illumination of the electroluminescent segments in the display portion by an optoelectronic matrix and photoconductor switching arrangement, as described and claimed in the aforenoted U.S. Pat. No. 3,440,637, or in a photoconductor arrangement as described and claimed in the U.S. Pat. No. Re. 26,207, there is provided a control network 224, as shown by FIGS. 1–3, for the electroluminescent display segments 110 and which control network 224 includes fine control transistor switches 120, coarse control transistor switches 156 and associated diode switching logic means 134. The improved control network 224, as shown in FIGS. 2 and 3, may be utilized with an electronic step integrator of a type such as described and claimed in the U.S. Pat. No. 3,427,609 and which step integrators may be applied in fine and coarse step integrator networks of the driven network 221 as taught in the U.S. Pat. No. 3,440,637. Thus the driven network 221 may in turn control the operation of the improved fine and coarse transistor switches and associated diode switching logic means of the control network 224, as heretofore explained.

Referring then to the block diagram of FIG. 1, the condition sensor 210 applies a direct current analog signal, as indicated by arrow 211, to the comparator 216. The comparator 216 compares the direct current analog signal, indicated by the arrow 211, with a direct current feedback signal, indicated by the arrow 211, with a direct current feedback signal, indicated by the arrow 227, to provide a differential output signal, indicated by the arrow 215, of one phase upon the analog signal 211 exceeding the feedback signal 227 and of an opposite phase upon the feedback signal 227 exceeding the analog signal 211. This differential output signal 215 is applied to an electronic drive circuitry 218 which may be of a type such as described and claimed in a U.S. Pat. No. 3,333,114, granted July 25, 1967 to Robert J. Molnar and Walter Parfomak and in the U.S. Pat. No. 3,440,637 by said Robert J. Molnar and Walter Parfomak, the joint inventors of the present invention, and assigned to The Bendix Corporation, the assignee of the present invention.

The drive circuitry 218 includes a control circuit which receives the differential output signal, as sown by the arrow 215, from the comparator 216 and upon the differential output signal 215 being of said one phase causes operation of the drive circuitry 218 in a sense to apply alternate driving pulses, as shown by the arrows 214 and 217 of FIG. 1, to a driven network and electronic step integrator 221 which may be of a type such as disclosed and claimed in the U.S. Pat. No. 3,427,609, by Robert J. Molnar and Walter Parfomak, and which integrator may be applied as taught in the U.S. Pat. No. 3,440,637 to fine and coarse memory systems.

Thus as taught in the U.S. Pat. No. 3,440,637, the driven network and step integrator 221 in response to the alternate driving pulses 214 and 217 applied by the drive circuitry 218 effect electrical signals, as indicated by the arrows 223 and 226, to selectively operate fine and coarse control transistor switches respectively of the improved control network 224 to selectively illuminate the electroluminescent display segments 110 by causing alternating current to be selectively applied thereto, as indicated by the arrow 230, upon the differential output signal 215 being of said one phase.

However, upon the differential output signal 215 being of an opposite phase the drive circuitry 218 is operated by the control circuit thereof in a sense to apply fine and coarse signal clearing pulses to the step integrator network 221, as explained in the U.S. Pat. No. 3,440,637, and as indicated in FIG. 1 by the arrows 219 and 220 so as to cause the integrator network 221 to selectively operate the fine and coarse control transistor switches 120 and 156 of the improved network 224, as shown by FIG. 2, so as to selectively terminate the alternating current selectively applied thereby to the segments 110, as indicated by the arrows 230. Such operation of the fine and coarse control transistor switches 120 and 156 will in turn selectively terminate the illumination of the electroluminescent display segments 110 upon the differential output signal 215 being of said opposite phase indicative of the feedback signal 227 exceeding the analog signal 211, as explained in the U.S. Pat. No. 3,440,637.

Furthermore, a summation network 222, as also explained in the aforenoted U.S. Pat. No. 3,440,637 may receive electrical signal information, as shown by the arrow 225, from the driven network 221 and direct a feedback signal indicated by the arrow 227 to the comparator 216 corresponding to the operative condition of the control network 224.

More specifically, the driven network 221 directs to the summation network 222 the signal information indicated by the arrow 225 corresponding to the operative condition of the fine and coarse control transistor switches of the control network 224 which in turn corresponds to the condition of illumination of the electroluminescent segments 110 controlled thereby, as shown in FIGS. 2 and 3.

The summation network 222, as explained with reference to the aforenoted U.S. Pat. No. 3,427,609 l and U.S. Pat. No. 3,440,637, then integrates the information signal until the direct current feedback signal voltage directed to the comparator 216 from the summation network 222, as indicated by the arrow 227 of FIG. 1, is equal to the direct current analog signal voltage directed to the comparator 216 from the condition sensor 210, as shown by the arrow 211. Thus, the DC feedback signal voltage acts in opposition to the DC analog signal voltage so that upon the resulting differential or error signal voltage being reduced to zero, the integration is accomplished.

Control Network For Electroluminescent Display Segments

The present invention resides in the unique circuitry employed to control and drive the electroluminescent display 110 through the provision of fine and coarse control transistor switches indicated generally by numerals 120 and 156 and associated diode switching logic means 134, shown in the block diagram and circuitry of FIGS. 2 and 3.

Thus, as shown in the block diagram of FIG. 1, the signals obtained from the condition sensor 210 are converted into a source of DC voltage and compared with a DC voltage obtained by the operation of the step integrator 221 and summation network 222 so that when the integrator 221 has reduced the error to zero, the proper number of coarse and fine control transistor switches 120 and 156 in the control network 224 will be activated to in turn illuminate the exact number of electroluminescent segments 110 corresponding to the analog value of the input signal by selectively applying to such segments an illuminating alternating current.

A typical instrument embodying the present invention may be applied to the fine and coarse memory sections of the step integrator system 221, as heretofore explained, and as a typical example there may be provided 209 electroluminescent segments which in the present invention may be divided into 19 coarse sections with 11 individual electroluminescent segments in each section, as shown herein by FIGS. 2 and 3, in which corresponding parts of the diode logic switching means 134 have been indicated by like numerals bearing the suffix A, B or C to indicate corresponding parts of the several sections as described.

Thus the first section 112 may include electroluminescent segments numbered 1 through 11, while the second section 114 may include electroluminescent segments numbered 12 to 22, and the succeeding sections 116 may in like manner each include 11 electroluminescent segments operated through the respective elements of the diode logic switching means.

Bearing in mind then the capacitive effect of each electroluminescent segment, it will be seen that each electroluminescent segment will be illuminated only upon an alternating current being applied across the opposite conductive layers of the electroluminescent segments and between which conductive layers is placed the phosphorus material, while upon a DC current being applied thereto the capacitive effect of the opposite conductive layers of the electroluminescent segments will block the passage of electrical current therethrough and prevent illumination thereof.

Thus, the display column 110, as shown schematically in FIG. 3, includes a series of electroluminescent segments which may be sequentially arranged, for example, with 33 of the segments to the inch and in sections of 11 segments as shown, for example, by the sections 112 and 114 of FIG. 3, with said segments being positioned in cooperative relation with suitable indicator lines marking the designations sequentially arranged, as shown, for example, in the U.S. Pat. No. Re. 26,207, from top to bottom or from bottom to the top, or from one side to the other side of the indicator.

Thus, in the example of the embodiment of the invention a herein provided, the electroluminescent display may be divided into 19 sections wherein each section includes 11 electroluminescent segments. Moreover, cooperating with a diode switching logic means 134 there may be provided ten fine control transistor switches 120 to control the sequential illumination of the first ten electroluminescent segments of each section.

As shown in FIG. 3, only three of these fine control transistor switches 120A, 120B and 120C have been shown, for purposes of illustration, for controlling the first, second and the tenth electroluminescent segments of the 19 sections. In like manner, seven additional fine control transistors are similarly arranged for individually controlling the remaining electroluminescent segments numbered 3 through 9 of section 112, segments numbered 14 through 20 of section 114, and corresponding segments of the remaining sections.

Each of the fine control transistor switches 120 includes a base element 122, a collector element 124, and an emitter element 126. The fine transistor switches 120 may be of an NPN type having the emitter 126 connected by a conductor 128 to a grounded conductor 130, while the collector element 124 of each of the fine control switches 120 is connected through a conductor 132 into a diode logic switching means 134 including a series of diode logic switching means 134 including a series of diodes indicated by way of example in FIG. 3 as 134A, 134B, 134C and 134D to the grounded conductor 130. The last of the series of diodes 134D has a cathode element 136 connected to the collector element 124 of the transistor switch 120A, while an anode element 138 of each of the series connected diodes 134 are in turn connected to the cathode element 136 of the next preceding diode 134 by conductors indicated by way of example as 140A, 140B and 140C, respectively. The anode element 138 of the first of the series connected diodes 134A is in turn connected to the grounded conductor 130.

Each of the ten fine control transistor switches have a similar series of diodes which are indicated herein by like numerals bearing the suffixed A, B or C indicative of the respective segmental sections 112, 114 and 116 to which the same pertain. Further leading from the conductor 140A and thereby from the cathode element 136 of the diode 134A controlled by the fine control transistor switch 120A is a conductor 141A which leads to one conductive layer of the electroluminescent segment indicated by the numeral 1 of the section 112 of electroluminescent segments 110.

Similarly, leading from the cathode element 136 of the diode 134A controlled by the second fine control transistor switch 120B is a conductor 142A which leads to the conductive layer at one side of the electroluminescent segment indicated by the numeral 2 of the section 112 of electroluminescent segments 110.

Also leading from the cathode element 136 of the diode 134A controlled by the tenth fine control transistor switch 120C is a conductor 150A which leads to the conductive layer at one side of the tenth electroluminescent segment indicated by the numeral 10 of the section 112 of the electroluminescent segments 110.

Each of the remaining electroluminescent segments indicated by the numerals 3 through 9 of the section 112 have one of the conductive layers thereof connected by electrical conductors 143A through 149A, respectively, to similar diode logic switching means 134 controlled by seven additional fine controlled transistors 120, not shown, and which are similarly arranged for individually controlling the remaining electroluminescent segments 3 through 9 of the section 112.

However, the eleventh electroluminescent segment of the section 112, indicated in FIG. 3 by the numeral 11, is controlled not by a fine control transistor 120 as are the first 10 segments, but rather by a coarse control transistor 156A. Thus one of the conductive layers of the electroluminescent segment 11 is connected by a conductor 152A to a collector element 154 of the coarse control transistor switch 156A having a base element 158 and an emitter element 160. The emitter element 160 is connected by a conductor 162 to the grounded conductor 130.

Further the conductor 152A leading from the one conductive layer of the electroluminescent segment 11 is connected through a conductor 163A to cathode elements 164 of diodes 165A having anode elements 166 connected to the conductors 140A connected between the anode element 138 and cathode element 136 of the respective diodes 134B and 134A of the several fine transistor controlled circuits. Thus, these diodes 165A are in turn operatively connected in the fine control network of the diode switching logic means 134 and controlled by the respective fine control transistor switches 120. The anode elements of the diodes 134A are connected to ground through the common conductor 130.

The diodes 165A provide a double function. Thus in one mode of operation the diodes 165A serve to connect in one sense the conductors 163A and 152A leading from one conductive layer of the electroluminescent segment 11 to the grounded conductor 130 through the diodes 134A which also serve to connect conductors 141A through 150A leading from one conductive layer of each of the electroluminescent segments 1–10 to the grounded conductor 130 in said one sense while in another mode of operation in the diodes 165A serve to connect in another sense the conductors 141A through 150A leading from the one conductive layer of each of the electroluminescent segments 1–10 to the conductors 163A and 152A leading from the one conductive layer of the electroluminescent segment 11 to the grounded conductor 130 upon the coarse transistor switch 156A being rendered conductive.

The opposite conductive layers of all of the electroluminescent segments 1 through 11 of the section 112 are connected by a common conductor 167A to one terminal connected by a conductor 169A to ground. The secondary winding 168A is in turn inductively coupled to a primary winding 170 of a transformer 171. The primary winding 170 is connected through a conductor 172 to one terminal of a suitable source of alternating current 174 having an opposite terminal connected to ground by a conductor 175 while the opposite terminal of the primary winding 170 is in turn connected by a conductor 177 to ground.

Each of the fine control transistor switches 120 have the base element 122 thereof connected by a biasing resistor 180 to the grounded conductor 130 so that each of the fine control transistor switches 120 is normally biased to a nonconductive state. However, there is also operably connected to the base element 122 of each of the transistors 120 a resistor 182 leading through respective conductors 184 to fine control output terminals F1 through F10 of a fine memory section of the step integrator 221.

Thus, upon a positive control pulse being applied through the conductors 184 from an appropriate output terminal of a controlled rectifier selectively rendered effective in the step integrator 221 as explained in the copending U.S. Pat. No. 3,427,609 this positive control pulse then applied to the base element 122 of the fine control transistors 120 thereupon will in turn selectively render the transistor 120 conductive to complete an alternating current circuit from the secondary winding 168A of the transformer 171. One phase of the alternating current induced in the secondary winding 168A will then be applied through the diode 134A to the grounded conductor 130 while an opposite phase will be applied through the remaining diodes 134 and the selectively rendered conductive transistor switches 120 to the grounded conductor 130. A positive ground phase will then be effective through the positive going diodes 134A while the opposite or negative ground phase of the alternating current cycle will be effective through the conductive fine control switching transistor 120 and the remaining diodes 134D, 134C and 134B to thus effect illumination of the electroluminescent segments so selectively connected across the secondary winding 168A.

It will be seen then that the respective electroluminescent segments 1 through 10 may be sequentially illuminated by the selective connection of the opposite conductive layers of the electroluminescent segments across the secondary winding 168A upon the application of the positive signal pulses to the base element of the selected transistor switch 120 from the fine output control terminals F1 through F10 of the controlled rectifiers of the step integrator circuit 221 of a type described and claimed in the U.S. Pat. No. 3,427,609 and which may be applied as a fine memory section as taught by the copending U.S. Pat. No. 3,440,637.

Each of the 19 coarse control transistor switches 156, two of which are shown for purposes of illustration in FIG. 3, and indicated by the numerals 156A and 156B have a biasing resistor 192 connected between the base element 158 and the grounded conductor 130 so as to normally bias the NPN-type transistor 156 to a nonconductive state.

There is also connected to the base element 158 of each of the coarse control transistor switches 156 a resistor 192 leading through a conductor 194 from appropriate coarse control output terminal C1 through C19 of controlled rectifiers selectively rendered conductive in an electronic step integrator which may be of a type described and claimed in the U.S. Pat. No. 3,427,609 and applied as a coarse memory section of the step integrator 221, as taught by the U.S. Pat. No. 3,440,637.

Now upon the coarse control transistor switch 156A being rendered conductive by the application to the base element 158 of a positive going pulse applied from the terminal C1 of the step integrator 221, the coarse control transistor switch 156A will be thereupon rendered conductive to complete an alternating current circuit across all of the electroluminescent segments 1 through 11 of section 112 from the secondary winding 168A of the transformer 170 so as to thereby provide a holding action.

Figure 4:
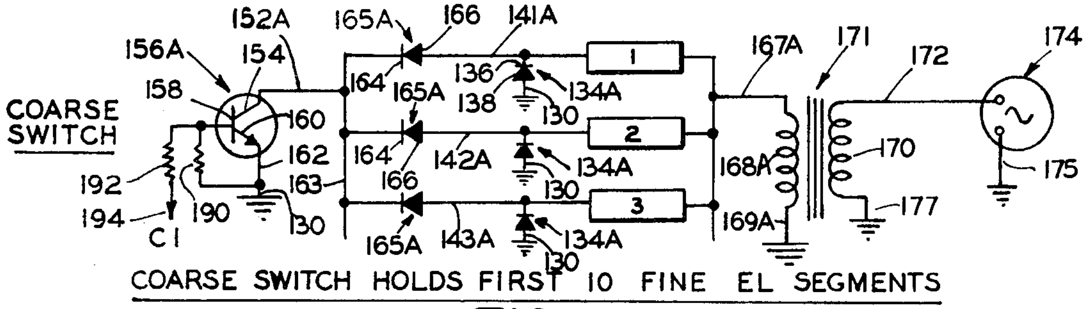
FIG. 4 is a fragmentary wiring diagram illustrating the holding function of a coarse control transistor switch as applied to individual segments of an associated section of the segments of the electroluminescent display device.

A positive ground phase of the alternating current induced in the secondary winding 168A will then be effective through the diodes 134A and 165A while an opposite or negative ground phase of the alternating current cycle will be effective through the diodes 165A and the conductive coarse control switching transistor 156A to continue to effect illumination of the electroluminescent segments 1 through 11, as shown by FIGS. 3 and 4, upon the coarse control switching transistor 156A being rendered conductive, even though the fine control switching transistors 120 be rendered nonconductive by the feedback action of the summation network 222, as explained in the U.S. Pat. No. 3,440,637.

Figure 5:
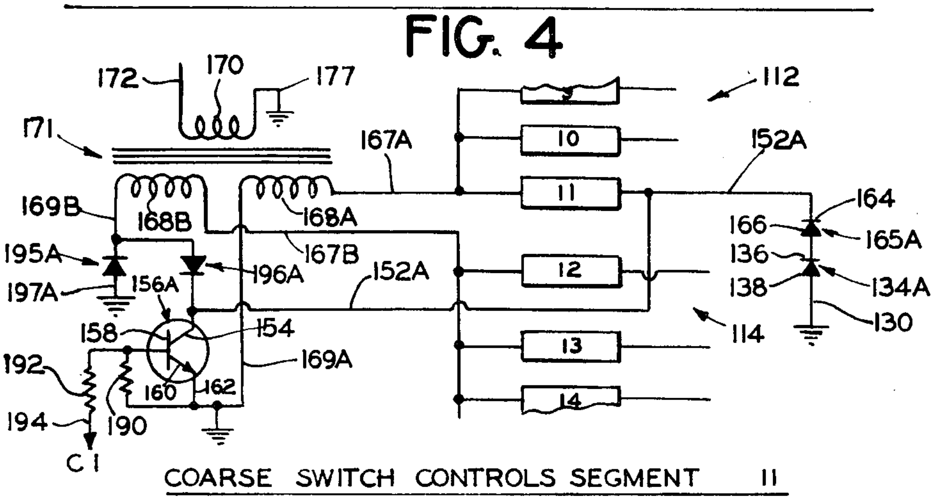
FIG. 5 is a fragmentary wiring diagram illustrating the selective control function of the coarse control transistor switch in effecting illumination of the final electroluminescent segment of the associated section.
Figure 6:
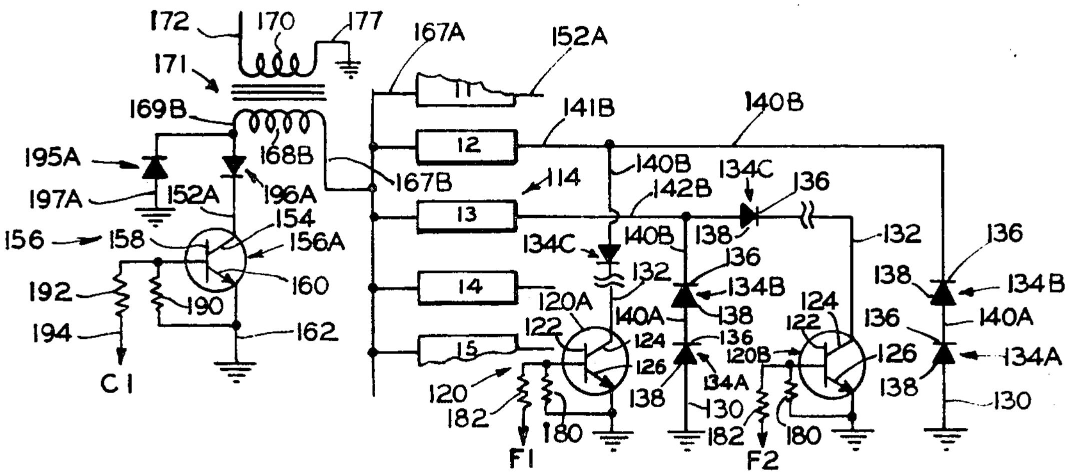
FIG. 6 is a fragmentary wiring diagram illustrating the additional function of the coarse control transistor switch in effectively conditioning the electroluminescent segments of the next succeeding section for individually controlled illumination by the fine control transistor switches and a next succeeding coarse control transistor switch associated with the next section.

In addition to the holding action thus effected upon the coarse control transistor switch 156A being rendered conductive, as illustrated by FIG. 4, the additional functions thereof are illustrated in FIGS. 5 and 6 in providing the illumination of the final electroluminescent segment 11 of section 112 and the further function, as shown by FIG. 6, in conditioning the electroluminescent segments 12 through 21 of the next succeeding section 114 for illumination upon the selective operation of the fine control switching transistors 120.

In order to illustrate the multiple functions provided by the coarse control transistor switches 156, these three simultaneous functions of the coarse control transistor switch 156A are indicated respectively by FIGS. 4, 5 and 6. The first function of the coarse control transistor switch 156A is shown with respect to FIG. 4 in which there is illustrated the manner in which the coarse control transistor switch 156A upon being rendered conductive serves to maintain the first ten electroluminescent segments 1 through 10 in an illuminated state.

In this connection, it should be borne in mind that the heretofore noted capacitive effect of the opposite conductive layers of the electroluminescent segments may be lateralized to alternating current operation by the addition of the diodes 134A connected across the transistor switch 156A, as shown by FIG. 4, while the diodes 165A are so arranged as to isolate the coarse control transistor switch 156A from the fine control transistor switches 120 for effecting selective operation of electroluminescent segments, as shown by FIGS. 3 and 4.

In addition to the holding action thus effected upon the coarse control transistor switches 156A being rendered conductive, the conductive condition of the coarse control transistor switch 156A also serves to connect the opposite conductive layers of the final electroluminescent segment 11 of the section 112 across the alternating current induced in the secondary winding 168A of the transformer 171, as shown by FIG. 5.

Assuming then a polarity for each half cycle of the alternating current induced in the secondary winding 168A, it will be seen that during a positive ground half cycle the alternating current induced in the winding 168A will be applied through the then positive grounded conductor 169A, conductor 130 and the diodes 134A and 165A to a conductive layer at one side of the electroluminescent segment 11. A return path is also effective through the conductor 167A leading from the opposite conductive layer of the electroluminescent segment 11 to the secondary winding 168A; while upon an opposite half cycle to the alternating current induced in the winding 168A will effect a reverse flow of current through the conductor 167A to the conductive layer at said opposite side of the electroluminescent segment 11 while the conductive layer at the aforesaid one side will be connected through the conductor 152A and the conductive coarse control transistor switch 156A to ground and thereby returning through the grounded conductor 169A to the winding 168A.

However, during the latter half cycle in the event the transistor switch 156A is not conductive, the transistor switch 156A and the diodes 165A, as shown by FIG. 5, will then block the flow of current from the conductor 152A to ground, so as to prevent illumination of the segment 11. It will be clear then that upon the transistor 156A being rendered conductive there will be completed an alternating current circuit from the secondary winding 168A across the opposite layers of the electroluminescent segment 11 for effecting illumination thereof, while illumination of the segment 11 will be terminated upon the transistor switch 156A being rendered nonconductive.

The third function effected upon the coarse control transistor switch 156A being rendered conductive is depicted by FIG. 6 and from which it will be seen that the coarse control transistor switch 156A upon being rendered conductive serves to condition the electroluminescent segments 12 through 21 of the next succeeding section 114 for a subsequent fine selective switching function to be effected by the fine control transistor switches 120, as shown by FIGS. 3 and 6. This is achieved by the coarse control transistor switch 156A being connected in a series relation with each of the fine control transistor switches 120, as shown by FIG. 6.

Moreover, as shown by FIGS. 3 and 6, in the section 114 as in the section 112 conductive layers of electroluminescent segments 12 through 22 of the section 114 are connected by corresponding conductors indicated by like numerals bearing the suffix B into the diode logic switching means 134 while a common conductor 167B connects opposite conductive layers of the segments in the section 114 to one terminal of another secondary winding 168B of the transformer 171. The secondary winding 168B has an opposite terminal connected by a conductor 169B to a cathode element of a diode 195A, as well as an anode element of a second diode 196A. The diode 195A has an anode element connected to ground through a conductor 197A while the diode 196A has a cathode element connected to the conductor 152A which will in turn lead through the coarse control transistor switch 156A to ground upon the transistor 156A being rendered conductive.

However, upon the coarse control transistor switch 156A being rendered nonconductive, a positive going phase of the alternating current applied at the conductor 169B will be effectively prevented from being applied across the electroluminescent segments 12 through 22 of the section 114 by a blocking action of the diode 195A so that upon the fine control transistor switches 120 being selectively rendered conductive, the alternating current induced in the secondary winding 168B will not be effective to cause illumination of the electroluminescent segments 12 through 22 of the section 114.

However, as shown by FIG. 6 upon the coarse control transistor switch 156A being rendered conductive then each of the fine control transistor switches 120 are rendered effective to selectively close an alternating current circuit from the secondary winding 168B for effecting illumination of the electroluminescent segments 12 through 21 controlled thereby, as heretofore explained, with reference to the electroluminescent segments of section 112.

The last electroluminescent segment 22 of the section 114 may in turn be selectively illuminated upon the second coarse control transistor switch 156B being rendered conductive which thereupon similarly performs the multiple function of holding the first ten fine electroluminescent segments 12 through 21 in an illuminated state, as well as causing illumination of the segment 22 and conditioning the electroluminescent segments, for example, segments 23, 24, 25 and 26 of a succeeding secton 116 for selective illumination by the fine control transistor switches 120, as heretofore explained.

The illumination of the subsequent 11 electroluminescent segments of the several 17 sections 116 will be similarly effected by the selective operations of the fine and coarse control transistor switches 120 and 156 which, while not shown in detail herein, will operate in a similar manner to that heretofore described with reference to the preceding section 114.

The control network of the electroluminescent display segments 110 of the present invention may be operated by digital input electrical control signals as well as by analog input electrical control signals and other desired electrical input control signals. Thus the coarse and fine switching devices 120 and 156 of the control network 224 may be operatively coupled to any suitable electrical control signals to cause the diode switching logic means 134 controlled thereby to selectively apply the source of alternating current to the electroluminescent segments 110 to provide the visual display.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for a definition of the limits of the invention.

What is claimed is:

1. In an indicator display system of a type including a plurality of electroluminescent segments, a source of alternating current for illuminating the electroluminescent segments, a condition sensor to provide an output signal proportional to a sensed condition, means including a comparator for comparing the output signal and a second signal to provide a differential signal of one phase upon the output signal exceeding the second signal and of another phase upon the second signal exceeding the output signal, a drive means for receiving said differential signal, said drive means including means for providing a signal of one sense upon the differential signal being of said one phase, a driven network including a step integrator to provide control signals in response to said signals of said one sense, said drive means including other means for providing signals of another sense upon the differential signal being of said other phase, means to apply said signals of said other sense to said driven network to terminate operation of the driven network and the control signals provided by the step integrator, and said driven network including means for receiving and integrating the control signals provided by said step integrator to provide the second signal applied to said comparator; the improvement comprising the plurality of electroluminescent segments being grouped in a plurality of successive sections, switching means, means to operatively couple said control signals to said switching means, and diode switching logic means controlled by said switching means to selectively apply said source of alternating current to said electroluminescent segments the switching means including a first plurality of switching devices operative by one set of said control signals, a second plurality of switching devices operative by another set of said control signals, said diode switching logic means including means controlled by said first switching devices to selectively condition each succeeding section of said electroluminescent segments for selective operation of said segments, and said diode switching logic means including means controlled by said second switching devices to selectively apply said source of alternating current to the electroluminescent segments of a preceding section and of a succeeding selected section to cause the selective illumination of individual electroluminescent segments so as to provide a visual display indicative of said sensed condition.

2. The improvement defined by claim 1 in which the first plurality of switching devices includes separate switching devices associated with each succeeding section of electroluminescent segments, said diode switching logic means including means controlled by the separate switching devices of said first switching devices to selectively condition the associated succeeding section of said electroluminescent segments for selective operation of said segments, and said diode switching logic means including means controlled by said second switching devices to selectively apply said source of alternating current to the electroluminescent segments of a preceding section and of any of said succeeding selected sections to cause the selective illumination of individual electroluminescent segments of the selected section so as to provide a visual display indicative of said sensed condition.

3. The improvement defined by claim 2 in which said diode switching logic means includes additional means operative by said separate switching devices so as to selectively apply said source of alternating current to a last segment of the electroluminescent segments of a section preceding the succeeding section associated with each of said separate switching devices to cause illumination of said last segment while providing a holding circuit for applying the source of alternating current to the other of the electroluminescent segments of the preceding section to retain the illumination thereof.

4. The improvement defined by claim 3 in which said diode switching logic means includes means operative by said separate switching devices to selectively condition a succeeding section of said electroluminescent segments associated with each of said separate switching devices for the selective application of said source of alternating current to the individual electroluminescent segments of the last selected section by the selective operation of said second control devices and another of said separate switching devices of said first control devices.

5. In an indicator display system of a type including a plurality of electroluminescent segments and a source of alternating current for illuminating the electroluminescent segments; the improvement comprising the plurality of electroluminescent segments being grouped in a plurality of successive sections, switching means operatively coupled to electrical control signals, and diode switching logic means controlled by said switching means to selectively apply said source of alternating current to said electroluminescent segments so as to provide a visual display dependent upon the electrical control signals operatively coupled to said switching means, the switching means including a first plurality of switching devices operatively coupled to a set of coarse control signals, a second plurality of switching devices operatively coupled to another set of fine control signals, said diode switching logic means including means controlled by said first switching devices to selectively condition each succeeding section of said successive sections of electroluminescent segments for selective operation of said segments, and said diode switching logic means including means controlled by said second switching devices to selectively apply said source of alternating current to individual selected electroluminescent segments of a preceding section and of a succeeding selected section to cause the selected illumination of the individual electroluminescent segments so as to provide a visual display dependent upon the coarse and fine electrical control signals operatively coupled to said first and second switching devices.

6. The improvement defined by claim 5 in which the first plurality of switching devices operatively coupled to a set of coarse control signals includes separate switching devices associated with each succeeding section of electroluminescent segments, said diode switching logic means including means controlled by the separate switching devices of said first switching devices to selectively condition the associated succeeding section of said electroluminescent segments for selective operation of said segments, and said diode switching logic means including means controlled by said second switching devices to selectively apply said source of alternating current to individual selected electroluminescent segments of a preceding section and of any of said succeeding selected sections to cause the selective illumination of individual selected electroluminescent segments of the selected section so as to provide a visual display dependent upon the coarse and fine electrical control signals operatively coupled to said first and second switching devices.

7. The improvement defined by claim 6 in which said diode switching logic means includes means operative by said separate switching means to selectively apply said source of alternating current to a last segment of the individual electroluminescent segments of a section preceding the succeeding section associated with each of said separate switching devices to cause illumination of said last segment while providing a holding circuit for applying the source of alternating current to the other of the individual electroluminescent segments of the preceding section so as to retain the illumination thereof.

8. The improvement defined by claim 7 in which said diode switching logic means includes means operative by said separate switching devices to selectively condition a succeeding section of said electroluminescent segments associated with each of said switching devices for the selective application of said source of alternating current to the individual electroluminescent segments of the last mentioned selected section upon the selective operation of said second control devices and another of said separate switching devices of said first control devices.